United States Patent [19]
Johanson

[11] Patent Number: 5,199,693
[45] Date of Patent: Apr. 6, 1993

[54] WORKPIECE HOLDING SYSTEM WITH LOCK SCREW

[76] Inventor: Lars Johanson, 72 Hillsdale Rd., Cedar Grove, N.J. 07009

[21] Appl. No.: 864,853

[22] Filed: Apr. 7, 1992

[51] Int. Cl.⁵ .............................................. B23Q 3/02
[52] U.S. Cl. ........................................................ 269/93
[58] Field of Search ..................................... 269/91–94, 269/309, 99–101, 82

[56] References Cited

U.S. PATENT DOCUMENTS

| | | |
|---|---|---|
| 280,125 | 6/1983 | Brauchler . |
| 439,279 | 10/1890 | Kramer . |
| 919,170 | 4/1909 | Holesteine . |
| 932,395 | 8/1909 | Kenney . |
| 1,653,030 | 12/1927 | Zeh . |
| 2,472,083 | 6/1949 | Bartholdy . |
| 3,172,654 | 3/1965 | Daniel et al. .................... 269/93 |
| 5,019,129 | 5/1991 | Johanson . |

Primary Examiner—Robert C. Watson
Attorney, Agent, or Firm—Jacobson, Price, Holman & Stern

[57] ABSTRACT

A workpiece holding system with lock screw in which the lock screw is placed axially in the center of an adjustment screw for an adjustment block thereby eliminating any deflection and eliminating any small errors. Since the lock screw is already spring pressured on the adjustment screw, the increased pressure of the lock screw will not cause any change in the adjustment of the adjustment block and since the lock screw is oriented in the center of the adjustment screw, there will be no deflection of the adjustment block.

6 Claims, 1 Drawing Sheet

WORKPIECE HOLDING SYSTEM WITH LOCK SCREW

BACKGROUND OF THE INVENTION

1. Field of the Invention

The present invention generally relates to a workpiece holding system which constitutes an improvement on my U.S. Pat. No. 5,019,129 which includes an adjustment screw in an adjustment block and a lock screw in the adjustment block alongside and spaced laterally of the adjustment screw with the lock mechanism providing a locking force which introduces a deflection in the adjustment block when the lock screw is rendered effective thereby introducing a small error. More specifically, the present invention is a workpiece holding system with lock screw in which the lock screw is placed axially in the center of the adjustment screw thereby eliminating any deflection and eliminating any small errors. Since the lock screw is already spring pressured on the adjustment screw, the increased pressure of the lock screw will not cause any change in the adjustment of the adjustment block and since the lock screw is oriented in the center of the adjustment screw, there will be no deflection of the adjustment block.

2. DESCRIPTION OF THE PRIOR ART

As indicated above, my U.S. Pat. No. 5,019,129 discloses an adjustment block in a workpiece holder with adjustment screws and lock screws for the adjustment block which are laterally spaced from the adjustment screws as illustrated in FIG. 1 of that patent. As also indicated above, the arrangement of the lock mechanism in the above mentioned patent can introduce a deflection in the adjustment block which can introduce small errors because the locking force is applied alongside the adjustment screws.

The prior art of record in the above mentioned patent does not disclose any structure equivalent to the arrangement of the lock screw axially along the center line of the adjustment screw as disclosed in this invention.

The following U.S. patents relate to various types of general purpose lock mechanisms.

U.S. Pat. Nos. 280,125
439,279
919,170
932,395
1,653,030
2,472,083

While the above patents disclose various types of lock nuts and other locking mechanisms for screw threaded members, none of the above patents disclose an arrangement equivalent to the arrangement of the adjustment screw and locking screw of this invention.

SUMMARY OF THE INVENTION

An object of the present invention is to provide an improved workpiece holding system utilizing a lock screw extending axially through the center of an adjustment screw utilized to adjust an adjustment block for holding a workpiece in an accurately adjusted position.

Another object of the invention is to provide a workpiece holding system with lock screw in which the adjustment screw is provided with an axial bore therethrough having an upwardly facing shoulder adjacent its upper end to receive a headed lock screw that is threaded into a base component of the workpiece holding system to lock the adjustment screw and adjustment block in accurately adjusted position without introducing any deflection forces onto the adjustment block.

A further object of the invention is to provide a workpiece holding system with lock screw in accordance with the preceding objects in which locking forces of the lock screw are exerted along the center of the adjustment screw thereby eliminating deflection of the adjustment block and resultant small errors which can occur due to such deflection.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
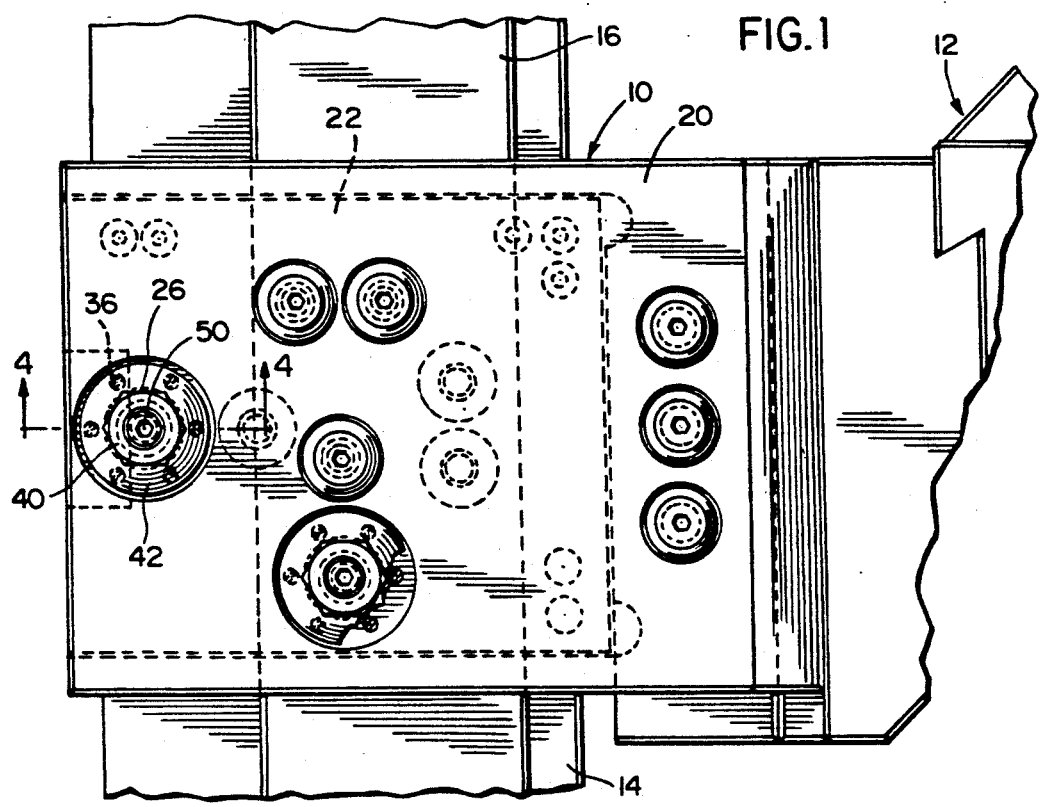
FIG. 1 is a top plan view of a workpiece holding system with the lock screw of the present invention incorporated into adjustment screws associated with an adjustment block.
Figure 2:
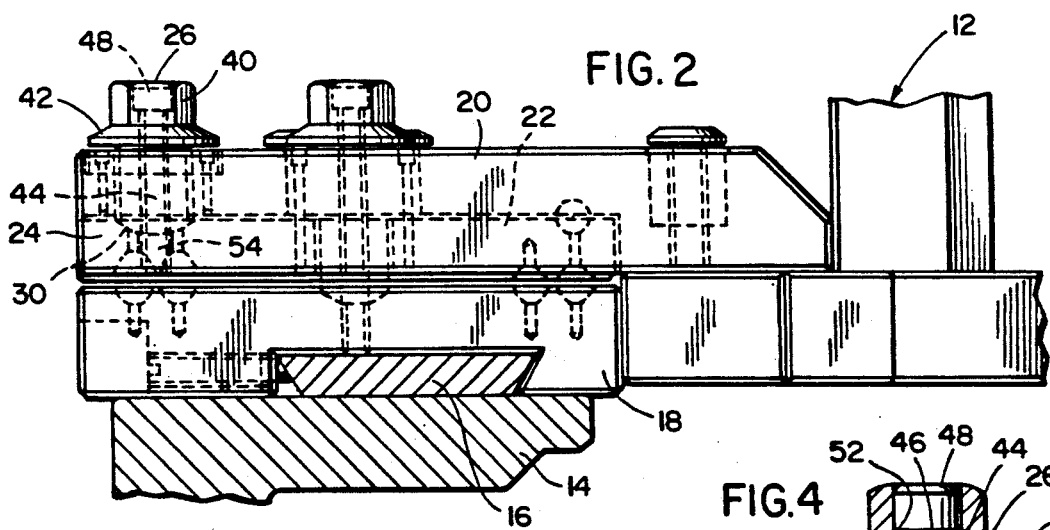
FIG. 2 is a side elevational view of the assembly of FIG. 1.
Figure 3:
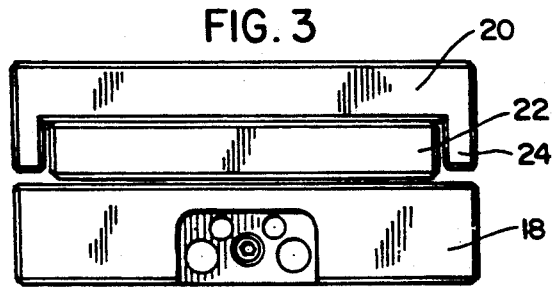
FIG. 3 is an end view of the construction of FIGS. 1 and 2 with the adjustment screws omitted.
Figure 4:
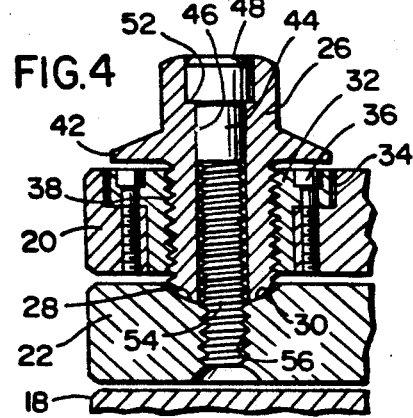
FIG. 4 is a vertical sectional view, on an enlarged scale, taken substantially upon a plane passing along section line 4—4 on FIG. 1 illustrating the specific structural details of the adjustment screw and lock screw associated therewith.

Referring to the drawing, a workpiece holding system is generally designated by reference numeral 10 and includes a workpiece supporting fixture generally designated by reference numeral 12 which is similar to that disclosed in my U.S. Pat. No. 5,019,129 to support a workpiece from a supporting structure 14 which has a longitudinally extending, upwardly projecting guideway 16 associated therewith which supports a slide 18 in longitudinally adjusted position thereon in a well known manner. An adjustment block 20 and base member 22 are connected to the slide with the edges of the adjustment block 20 depending alongside the base 22 as indicated by reference numeral 24 all of which represents previously known structure as shown in my prior patent. The adjustment block 20 is provided with adjustment screws 26 which are threaded through the adjustment block 20 and include a lower end 28 having a generally spherical surface engaged with a correspondingly shaped recess 30 in the base 22 as illustrated in FIG. 4. The adjustment screw 26 is received in an internally threaded insert 32 secured in a shouldered recess 34 by cap screws 36 with the interior of the insert 32 and the exterior of the adjustment screw including a threaded connection 38. The upper end of the adjustment screw 26 is provided with a polygonal head 40 with a peripheral flange 42 at the lower end of the polygonal head 40.

Rather than lock screws being provided alongside of the adjustment screws as in my U.S. Pat. No. 5,019,129, the present invention involves the use of an elongated lock screw 44 which extends through a bore 46 that extends axially completely through the length of the adjustment screw 26 with the center of the bore 46 coinciding with the center of the adjustment screw 26.

The upper end of the lock screw 44 includes a head 48 and an internal polygonal recess 50 to receive a suitable wrench or tool to rotate the lock screw. The head 48 bottoms against a shoulder 52 formed in the bore 46 to limit the downward movement of the lock screw 44 through the bore 46. The lower end portion of the lock screw 44 is externally threaded at 54 and is threaded into an internally threaded bore 56 in the supporting base 22 with the internally threaded bore 56 extending axially into the base 22 in alignment with the center of the recess 30 which is engaged by the spherical bottom end 28 of the adjustment screw 26. With this construction, after the adjustment screw has been manipulated to properly adjust the adjustment block 20, the lock screw 44 is then manipulated to lock the adjustment screw 26 in adjusted position by exerting a reaction force between the head of the cap screw 44, shoulder 52, the lower end of the adjustment screw 26, the surface of the recess 30 and the threaded connection between the threaded lower end 54 of the lock screw 44 and the internal threaded bore 56 in the base 22. This locking force will not introduce any deflection into the adjustment block since the locking force occurs between the adjustment screw 26 and the supporting base 22 thus eliminating any downward or upward force from being exerted on the adjustment block 20. This structure and its function eliminates any possibility of a deflecting force being exerted on the adjustment block 20 thereby eliminating any small errors which would be introduced into the workpiece holding system as could occur when a lock screw extends through the adjustment block and exerts a locking force on the adjustment block.

With the lock screw positioned in the center of the adjustment screw there is no deflection of the assembly. Since the assembly is already spring pressured on the adjustment screws, the increased pressure of the lock screw will not cause any change in the adjustment thus providing a positive and secure lock for the adjustment screw without introducing any deflection in the adjustment block thereby eliminating small errors which can be caused by a locking force being exerted alongside of and laterally spaced from the adjustment screw.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A workpiece holding system comprising an adjustment block mounted on a support base, an adjustment screw threaded through the adjustment block and having a lower end engaged with the support base to adjust the adjustment block toward or away from the support base to accurately position a workpiece holding fixture and a lock screw extending axially through a bore in the adjustment screw and including a headed upper end engaged with the adjustment screw and a threaded lower end threaded into an internally threaded bore in the support base to lock the adjustment screw in relation to the support base and adjustment block without introducing any deflective force on the adjustment block, said lock screw including a head at the upper end thereof of cylindrical configuration, said adjustment screw receiving bore including a shoulder upwardly adjacent the upper end thereof for engagement by the head on the upper end of the lock screw for exerting a locking force on the adjustment screw to lock the adjustment screw to the support base to prevent rotation of the adjustment screw.

2. The workpiece holding system as defined in claim 1 wherein the lower end of the adjustment screw is generally spherically curved, said support base including a generally spherical curved recess engaged by the lower end of the adjustment screw.

3. The workpiece holding system as defined in claim 2 wherein said adjustment screw includes a polygonal upper end and a peripheral flange located at the bottom of the polygonal upper end, said lock screw including a polygonal recess in the upper end thereof for receiving a tool for rotatably manipulating the lock screw.

4. A workpiece holder comprising a base adapted to be adjustably mounted on a support, an adjustment block mounted on said base in overlying relation thereto and adapted to support a workpiece, an adjustment screw threaded through the adjustment block and engaged with the base to adjust the relationship between the base and adjustment block, said adjustment screw including an unthreaded longitudinal bore extending therethrough, said base including a screw threaded bore therein in alignment with said bore through the adjustment screw, and a lock screw extending through the unthreaded bore in the adjustment screw and screw threaded into the screw threaded bore in the base, means on an upper portion of the lock screw engaged with said adjustment screw to exert downward force thereon with all of the downward force applied to the adjustment screw being exerted on said base to lock the adjustment screw with respect to the base and adjustment block without exerting a deflection force on the adjustment block.

5. In a workpiece holder including a base adjustably mounted on a support, an adjustment block mounted on said base and adapted to support a workpiece, and an adjustment screw threaded through the adjustment block and engaged with the base to adjust the relationship between the base and adjustment block, the improvement comprising a longitudinal bore extending through said adjustment screw, said base including a screw threaded bore therein in alignment with said bore through the adjustment screw, and a lock screw extending through the bore in the adjustment screw and screw threaded into the screw threaded bore in the base to lock the adjustment screw without exerting a deflection force on the adjustment block, said bore in the adjustment screw including a shoulder facing outwardly from the base, said lock screw including a shank and head engaged with said shoulder to exert locking force on the adjustment screw.

6. The workpiece holder as defined in claim 4 wherein said means on an upper portion of the lock screw engaged with said adjustment screw includes a head on said lock screw, said adjustment screw including a shoulder and an upper end portion of the unthreaded bore through the adjustment screw with the shoulder being engaged by the head of the lock screw to exert downward locking force on the adjustment screw with the downward force on the adjustment screw being imparted to said base at the point of engagement between the adjustment screw and said base.

* * * * *